(12) United States Patent  
Conti

(10) Patent No.: US 8,185,952 B2
(45) Date of Patent: May 22, 2012

(54) STATIC AND DYNAMIC FIREWALLS

(75) Inventor: Gregory R. Conti, Saint Paul (FR)

(73) Assignee: Texas Instruments Incorporated, Dallas, TX (US)

(*) Notice: Subject to any disclaimer, the term of this patent is extended or adjusted under 35 U.S.C. 154(b) by 1303 days.

(21) Appl. No.: 11/678,219

(22) Filed: Feb. 23, 2007

(65) Prior Publication Data
US 2008/0163359 A1 Jul. 3, 2008

(51) Int. Cl.
*G06F 21/00* (2006.01)
(52) U.S. Cl. .......... 726/22; 726/24; 726/2; 726/16
(58) Field of Classification Search ............ 726/17, 726/24; 713/187, 188
See application file for complete search history.

(56) References Cited

U.S. PATENT DOCUMENTS
2006/0015749 A1* 1/2006 Mittal .................... 713/190
2007/0180524 A1* 8/2007 Choi et al. ................ 726/23

FOREIGN PATENT DOCUMENTS
EP 1619572 A1 * 1/2006

* cited by examiner

*Primary Examiner* — Kambiz Zand
*Assistant Examiner* — Imhotep Durham
(74) *Attorney, Agent, or Firm* — Ronald O. Neerings; Wade James Brady, III; Frederick J. Telecky, Jr.

(57) ABSTRACT

A system comprising control logic adapted to activate multiple security levels for the system. The system further comprises a storage coupled to the control logic and comprising a stack, the stack associated with one, but not all, of the multiple security levels. The system also comprises security logic coupled to the control logic and adapted to restrict usage of the system if the control logic attempts to fetch an instruction op-code from the stack.

13 Claims, 4 Drawing Sheets

STATIC AND DYNAMIC FIREWALLS

BACKGROUND

Mobile electronic devices such as personal digital assistants (PDAs) and digital cellular telephones are increasingly used for electronic commerce (e-commerce) and mobile commerce (m-commerce). Programs that execute on the mobile devices to implement e-commerce and/or m-commerce functionality may need to operate in a secure mode to reduce the likelihood of attacks by malicious programs (e.g., virus programs) and to protect sensitive data.

For security reasons, at least some processors provide two levels of operating privilege: a first level of privilege for user programs; and a higher level of privilege for use by the operating system. The higher level of privilege may or may not provide adequate security, however, for m-commerce and e-commerce, given that this higher level relies on proper operation of operating systems with highly publicized vulnerabilities. In order to address security concerns, some mobile equipment manufacturers implement yet another third level of privilege, or secure mode, that places less reliance on corruptible operating system programs, and more reliance on hardware-based monitoring and control of the secure mode. An example of one such system may be found in U.S. Patent Publication No. 2003/0140245, entitled "Secure Mode for Processors Supporting MMU and Interrupts."

In addition to this secure mode, various hardware-implemented security firewalls and other security monitoring components have been added to the processing systems used in mobile electronic devices to further reduce the vulnerability to attacks. Despite this addition of security protection in the processing hardware, mobile electronic devices remain vulnerable to a common software security attack known generically as "stack buffer overflow." In a stack buffer overflow attack, executable code is written on an execution stack and the return address of a currently executing function is modified so that it will point to the beginning of this new code. When the function call returns, the attacker's code is executed.

SUMMARY

Accordingly, there are disclosed herein techniques by which a system is protected from malicious attacks such as those described above (e.g., buffer overflow attacks). An illustrative embodiments includes a system comprising control logic adapted to activate multiple security levels for the system. The system further comprises a storage coupled to the control logic and comprising a stack, the stack associated with one, but not all, of the multiple security levels. The system also comprises security logic coupled to the control logic and adapted to restrict usage of the system if the control logic attempts to fetch an instruction op-code from the stack.

Another illustrative embodiment includes a system comprising a storage having a range of memory addresses associated with a security mode of the system. The system also comprises firewall logic coupled to the storage and adapted to restrict usage of the system if a signal attempting to access an instruction op-code from memory associated with the range of addresses is detected.

Yet another illustrative embodiment includes a method of protecting a system comprising monitoring memory access signals, at least a portion of the memory associated with one, but not all, of a plurality of security modes. The method also comprises restricting usage of the system if one of the memory access signals attempts to access an instruction op-code from the portion.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Inasmuch as the systems and methods described herein were developed in the context of a mobile computing system, the description herein is based on a mobile computing environment. However, the discussion of the various systems and methods in relation to a mobile computing environment should not be construed as a limitation as to the applicability of the systems and methods described herein to only mobile computing environments. The teachings herein can be applied to any type of system (e.g., desktop computers).

Figure 1:
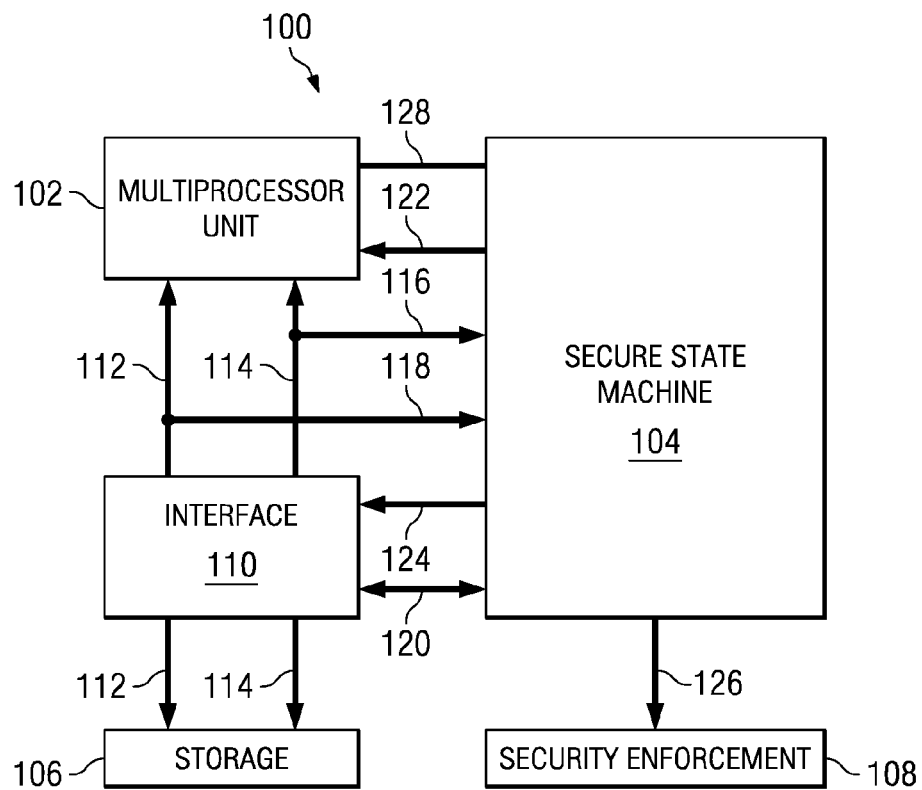
FIG. 1 shows a block diagram of a system in accordance with embodiments of the invention.

The system disclosed herein comprises a hardware-based firewall subsystem which protects the system from malicious attacks, such as buffer overflow attacks. FIG. 1 shows the system 100 in accordance with one or more embodiments of the invention. The system 100 preferably comprises an ARM® TrustZone® architecture, but the scope of this disclosure is not limited as such. In accordance with at least some embodiments, the system 100 may be, or may be contained within, a mobile device such as a cellular telephone, personal digital assistant (PDA), text messaging system, and/or a device that combines the functionality of a messaging system, PDA and a cellular telephone. The system 100 includes a multiprocessor unit (MPU) 102 and a secure state machine (SSM) 104 comprising the firewall subsystem (shown in FIG. 4). The MPU 102 couples to a storage 106 via an interface 110, a write bus 112 and a read bus 114. The write bus 112 and read bus 114 also couple to the SSM 104 via buses 118 and 116, respectively. The SSM 104 monitors activity (e.g., data transactions, instruction op-code fetches) on the read and write buses to detect specific activities which indicate the possibility that a malicious attack is being carried out on the system 100. If such malicious activity is detected, the SSM 104 sends security violation signals to one or more of the MPU 102, the interface 110, and/or the security enforcement module 108, depending on the specific violation that has occurred. Upon receiving a security violation signal, each of the MPU 102, the interface 110, and the security enforcement module 108 takes a different action to prevent or at least mitigate damage to the system 100.

The system 100 is capable of operating within a variety of different security modes. The security modes of the system 100 are established to protect memory in the storage 106 from attack. Specifically, the storage 106, which may comprise random access memory (RAM), NOR and NAND flash memory, synchronous dynamic RAM (SDRAM), etc., is partitioned into public and secure domains. The public domain is accessible in a non-secure mode and the secure domain is accessible only in a secure mode. In at least some embodiments, the public and secure domain partitions are virtual (i.e., non-physical) partitions generated and enforced by a memory management unit (MMU) in the MPU 102 (shown in FIG. 4).

Figure 2:
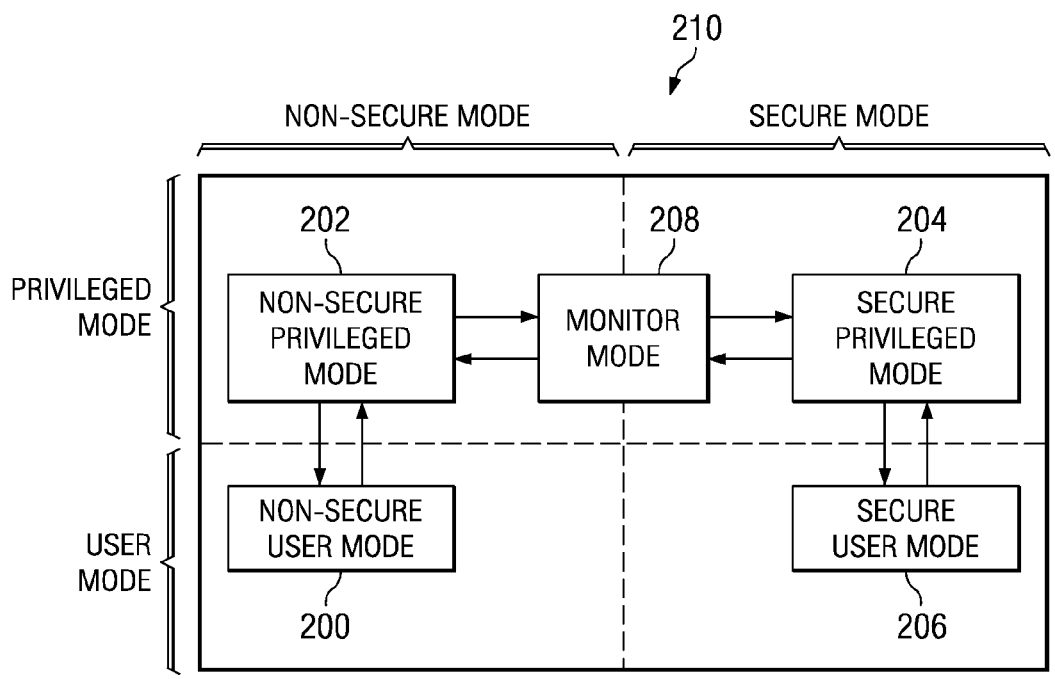
FIG. 2 shows a block diagram describing a security infrastructure in accordance with embodiments of the invention.

Each of the secure and non-secure modes may be partitioned into "user" and "privileged" modes. Programs that interact directly with an end-user, such as a web browser, are executed in the user mode. Programs that do not directly interact with an end-user, such as the operating system (OS), are executed in the privileged mode. By partitioning the secure and non-secure modes in this fashion, a total of four security modes are available. As shown in FIG. 2, in order of ascending security level, these four modes include the non-secure user mode 200, the non-secure privileged mode 202, the secure user mode 204, and the secure privileged mode 206. There is an additional security mode, called the monitor mode 208, between the modes 202 and 204. The computer system 100 may operate in any one of these five modes at a time.

The computer system 100 may switch from one mode to another. FIG. 2 illustrates a preferred mode-switching sequence 210. The sequence 210 is preferred because it is more secure than other possible switching sequences. For example, to switch from the non-secure user mode 200 to the secure privileged mode 204, the system 100 should first pass through non-secure privileged mode 202 and the monitor mode 208. Likewise, to pass from the secure user mode 206 to the non-secure user mode 200, the system 100 should switch from the secure user mode 206 to the secure privileged mode 204, from the secure privileged mode 204 to the monitor mode 208, from the monitor mode 208 to the non-secure privileged mode 202, and from the non-secure privileged mode 202 to the non-secure user mode 200.

Figure 3:
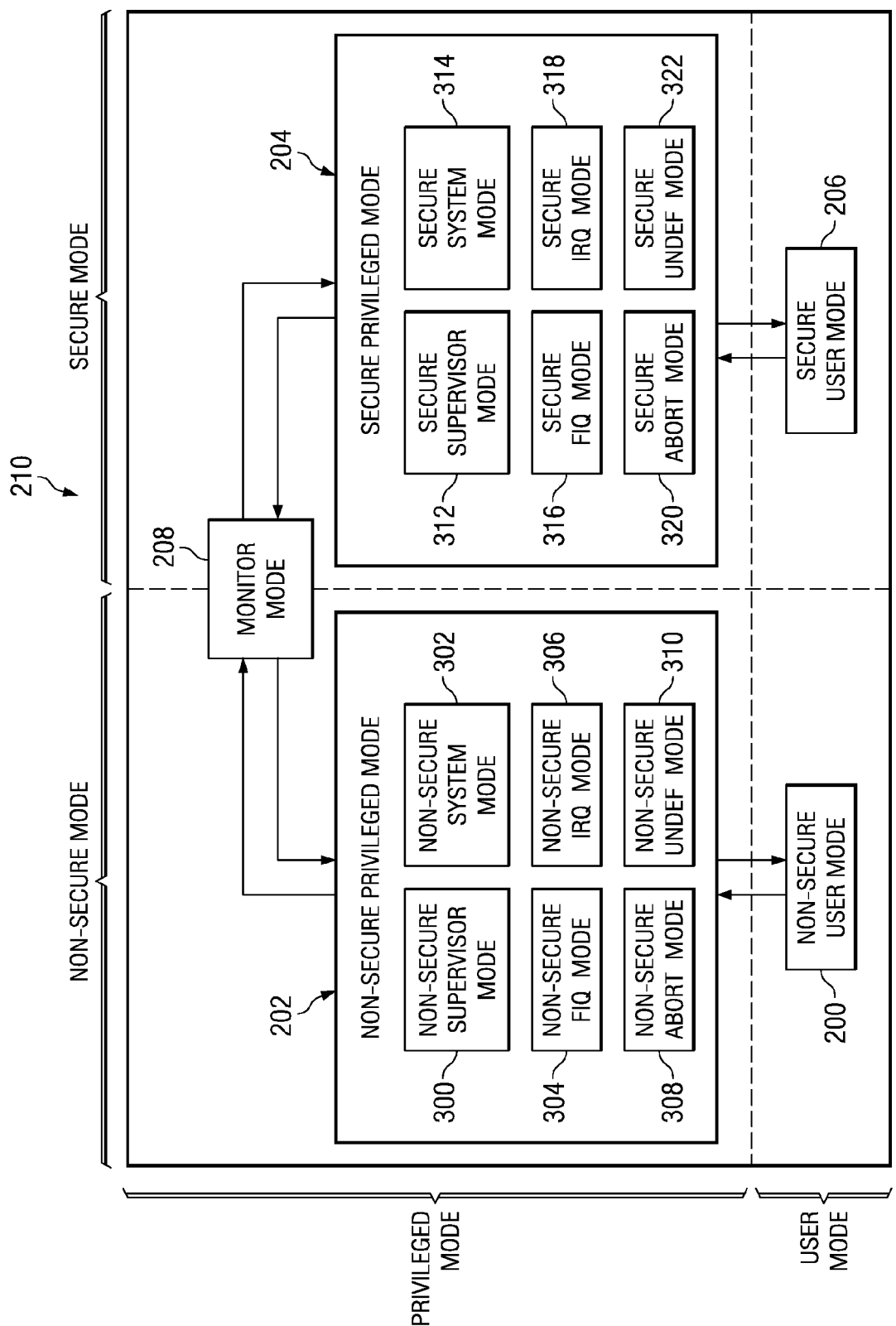
FIG. 3 shows a detailed version of the security infrastructure of FIG. 2, in accordance with preferred embodiments of the invention.

Some of the five security modes shown in FIG. 2 comprise additional sub-modes, as shown in FIG. 3. FIG. 3 shows the non-secure privileged mode 202 comprising six sub-modes 300-310. Specifically, the non-secure privileged mode 202 comprises a non-secure supervisor mode 300, a non-secure system mode 302, a non-secure FIQ mode 304, a non-secure IRQ mode 306, a non-secure abort mode 308, and a non-secure UNDEF mode 310. Similarly, the secure privileged mode 204 comprises six sub-modes 312-322. In particular, the secure privileged mode 204 comprises a secure supervisor mode 312, a secure system mode 314, a secure FIQ mode 316, a secure IRQ mode 318, a secure abort mode 320, and a secure UNDEF mode 322. Each of these modes, except for the supervisor and system modes, is dedicated to one or more software actions and is triggered by an exception vector. By contrast, the supervisor and system modes are execution modes.

Briefly referring to FIG. 1, the security mode of the system 100 is determined using security bits stored in the MPU 102. Adjusting the security bits adjusts the security mode of the system 100. Bus 128, which couples the MPU 102 and the SSM 104, provides a copy of the security bits to the SSM 104 so that the SSM 104 may determine the current security mode of the system 100. Informing the SSM 104 of the current security mode of the system 100 enables the SSM 104 to protect the system 100 appropriately.

Each of the security modes shown in FIG. 3 preferably is allocated a portion of the memory in storages 106. At least some of the memory allocated to the security modes is in the form of "stacks," which are data structures capable of storing data in a last-in, first-out (LIFO) format. Each security mode is assigned a different stack so that, for example, the stack of a secure mode is not corrupted by data associated with a non-secure mode. When the system 100 is operating in a particular security mode, the stack associated with that mode is used and stacks associated with other modes are not used.

In some cases, the system 100 may engage in multi-thread processing. Accordingly, some of the security modes shown in FIG. 3 are assigned multiple stacks, each stack associated with a different thread (or "context"). For example, while in secure supervisor mode 312, the MPU 102 may use a stack associated with the secure supervisor mode 312 to temporarily store data while executing in a first thread. If the MPU 102 needs to switch to a second thread while operating in the same secure supervisor mode 312, a second stack associated with the secure supervisor mode 312 is used in the second thread. If the MPU 102 needs to resume operating in the first thread, the original stack is used in lieu of the second stack.

Referring to FIG. 1, when switching from a first thread to a second thread (and thus from a first stack to a second stack), the MPU 102 stores context information associated with the first stack in the SSM 104. Context information may include the range of addresses associated with the first stack, a pointer indicating a current position in the first stack, and one or more bits indicating the type of security mode associated with the first stack. When the MPU 102 needs to resume using the first stack, the context information is retrieved from the SSM 104 and is used to find the first stack and to find the current position in the first stack.

The storage of context information in the SSM 104 is advantageous because the SSM 104 may use the context information to monitor the write and read buses 112 and 114 for malicious activity. The SSM 104 may conceivably use the context information to enforce security in myriad ways, and all such permutations are encompassed within the scope of this disclosure. In one possible security technique, the SSM 104 restricts access to the various memory stacks in the storage 106 to data accesses only. If the SSM 104 detects an attempt by the MPU 102 to fetch an instruction op-code from a stack, the SSM 104 generates one or more alert signals, which are serviced as described further below. In this way, the SSM 104 is able to thwart various types of attacks, such as buffer overflow attacks, which intend to hijack execution flow and which can involve the fetching of instruction op-codes off of dedicated security mode stacks in the storage 106.

In another possible security technique, the SSM 104 ensures that each dedicated security mode stack in the storage 106 is protected from being accessed in unauthorized security modes. For example, if the SSM 104 determines (i.e., using the SECMON bus 128) that the system 100 is in a non-secure user mode 200 and that the MPU 102 is attempting to access a stack that is associated with the monitor mode 208, the SSM 104 generates one or more alert signals.

In still another possible security technique, the SSM 104 may be pre-programmed to monitor the write and read buses 112 and 114 for specific activities which, if detected, cause the SSM 104 to generate security violation signals. For example, if the SSM 104 determines via the write bus 112 that the MPU 102 is attempting to write to the same location in the same stack two consecutive times (as is often done with buffer overflow attacks), the SSM 104 may generate one or more alert signals. The SSM 104 is not limited to the protective security measures described above. Any and all such monitoring techniques are encompassed within the scope of this disclosure. The three possible security techniques specifically mentioned above are now described in detail with reference to FIG. 4.

Figure 4:
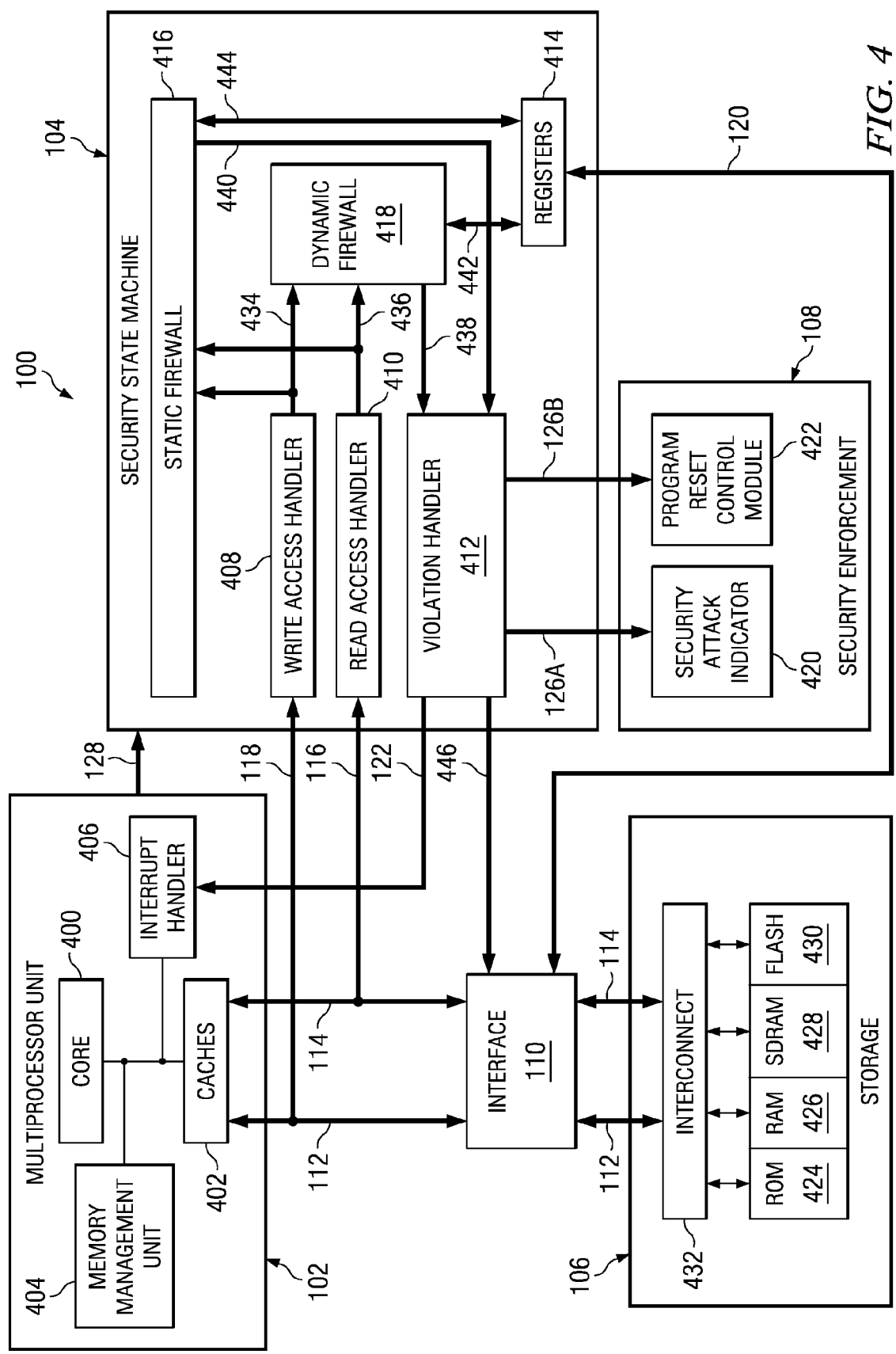
FIG. 4 shows a detailed version of the system of FIG. 1, in accordance with preferred embodiments of the invention.

FIG. 4 shows the system 100 of FIG. 1 in detail. The MPU 102 comprises a core 400 which couples to a plurality of caches 402, a memory management unit (MMU) 404 and an interrupt handler 406. The storage 106 comprises an interconnect 432 which couples ROM 424, RAM 426, SDRAM 428 and FLASH 430 with the write and read buses 112 and 114. The security enforcement module 108 comprises a security attack indicator 420 and a program reset control module 422. The SSM 104 comprises a write access handler 408 and a read access handler 410. The write access handler 408 couples to a static firewall 416 and a dynamic firewall 418 via bus 434. The read access handler 410 couples to the static firewall 416 and the dynamic firewall 418 via bus 436. The dynamic firewall 418 couples with a violation handler 412 via bus 438 and registers 414 via bus 442. The static firewall 416 couples with the violation handler 412 via bus 440 and registers 414 via bus 444. The violation handler 412 couples with the security attack indicator 420 via bus 126A and the program reset control module 422 via bus 126B. The violation handler 412 further couples with the interface 110 via bus 446 and the interrupt handler 406 via bus 122.

As described above, memories in the storage 106 (e.g., ROM 424, RAM 426) allocate memory space for a plurality of dedicated security mode stacks. Each security mode of the system 100 is assigned to one or more of the stacks, so that when the system 100 is operating in a particular security mode, the stack of that security mode is used to temporarily store data. If a thread switch occurs from a first thread to a second thread, the context of the stack used in the first thread is stored in the registers 414 (e.g., via interface 110 and bus 120), and a different stack is used in the second thread. As previously mentioned, the context of the stack may include information such as a range of memory addresses associated with the stack, a pointer indicating a current position in the stack, a security level associated with the stack, etc. In some embodiments, the registers 414 in the SSM 104 are programmed with the range of addresses associated with each dedicated security mode stack, as well as an identifier indicating the security mode associated with each stack.

Data writes performed via the write bus 112 are monitored by the write access handler 408 via bus 118. Likewise, data reads performed via the read bus 114 are monitored by the read access handler 410 via bus 116. The write and read access handlers 408 and 410 decode signals carried on the buses 112 and 114 and transfer the decoded signals to the static firewall 416 and dynamic firewall 418 via buses 434 and 436, respectively.

Although each of the firewalls 416 and 418 monitors the decoded signals for different types of malicious activity, each of the firewalls operates in a similar manner. Specifically, each firewall receives a decoded signal from one of the write or read access handlers and compares the decoded signal to context information stored in the registers 414. If, by performing such a comparison, a firewall determines that an attack is being carried out, the firewall sends a violation signal to the violation handler 412. In turn, the violation handler 412 takes appropriate action to prevent or at least mitigate damage to the system 100. Each of the firewalls is now described in turn.

The static firewall 416 preferably is a hardware-based firewall. The static firewall 416 uses signals received from the write and read access handlers 408 and 410 to detect malicious activity. Specifically, each signal processed by the read access handler 408 comprises a memory address and further comprises data associated with that memory address. The static firewall 416 compares the memory address with each of the ranges of addresses associated with the security mode stacks stored in the storage 106. If the memory address falls within one of these ranges, and further if the static firewall 416 determines that the read signal is an attempt to fetch an instruction op-code from this memory address, then it is determined that the MPU 102 is attempting to fetch an instruction op-code from a dedicated security mode stack, an action which is indicative of a buffer overflow attack. Accordingly, the static firewall 416 issues a violation signal to the violation handler 412 via bus 440. The violation handler 412 services the violation signal as described further below.

In addition, the static firewall 416 compares the address associated with each read and/or write signal to the ranges of addresses associated with the dedicated security mode stacks to determine if the MPU 102 is attempting to access a stack whose security level is higher than the current security level of the system 100. Specifically, if it is determined that the MPU 102 is attempting to access a dedicated security mode stack, the static firewall 416 further compares the current security mode of the system 100 (i.e., determined using SECMON bus 128) to the security mode associated with that stack. If the two security modes match, or if the current security mode of the system 100 is more secure than the security mode associated with the stack, the static firewall 416 preferably takes no action. However, if the two security modes do not match, or if the current security mode of the system 100 is less secure than the security mode associated with the stack, the static firewall 416 issues a violation signal to the violation handler 412 via bus 440. The violation handler 412 services the violation signal as described further below.

Like the static firewall 416, the dynamic firewall 418 preferably is a hardware-based firewall. The dynamic firewall 418 monitors stack accesses for activity that is indicative of a malicious attack. The dynamic firewall 418 may be programmed with one or more pre-determined activities which, if detected, indicate a malicious attack. If the activity detected on a read or write bus matches one of the pre-determined activities, the dynamic firewall 418 issues a violation signal to the violation handler 412 via bus 438. For example, buffer overflow attacks are often characterized by the writing of data to the same memory location in the same stack two or more times in a row. If the dynamic firewall 418 detects two consecutive write signals that have the same destination memory address, and further if this destination memory address falls within an address ranges of a dedicated security mode stack (i.e., determined using registers 414 and bus 442), the dynamic firewall 418 may issue a violation signal to the violation handler 412 via bus 438.

Specifically, the dynamic firewall 418 may comprise a temporary storage (e.g., a register) in which it logs the destination memory address of each write operation to a dedicated security mode stack. Upon receiving a next write operation, the firewall 418 compares the destination address stored in the temporary storage with the destination memory address of the received write operation. If the two match, it is determined that the MPU 102 is attempting to write to the same location in the same stack two consecutive times in a row. As such activity is indicative of a buffer overflow attack, the firewall 418 issues a violation signal to the violation handler 412 via bus 438. Multiple variations of this general security technique are possible, and the scope of this disclosure encompasses any and all such variations.

Upon receiving a violation signal from a firewall, the violation handler 412 takes appropriate action to prevent or at least mitigate damage to the system 100. Specifically, the violation handler 412 decodes a received violation signal to determine what type of action should be taken in response to the malicious activity being carried out on the system 100. In some cases, the violation handler 412 may send an alert signal to the program reset control module 422, thereby resetting a currently executing program. In other cases, the violation handler 412 may send an alert signal to the security attack indicator 420, thereby providing an indication to a user of the system 100 that system integrity has been compromised. Such an indication may take the form of a visual indication (e.g., an alert message on a display, a flashing light-emitting-diode (LED)), an audible indication (e.g., a ring tone or a beeping tone), or a tactile indication (e.g., vibration), although the scope of this disclosure is not limited to these possibilities. In yet other cases, the violation handler 412 may send an alert signal to the interface 110, causing the interface 110 to abort a current instruction op-code fetch or data retrieval. In still other cases, the violation handler 412 may send an alert signal to the interrupt handler 406, causing the interrupt handler 406 to stop the core 400 from executing malicious code. In some embodiments, a combination of one or more of the above alert signals may be generated by the violation handler 412 in response to a received violation signal. The violation handler 412 may comprise a data structure that cross-references various types of possible violation signals with suitable actions that may be taken in response to receipt of the violation signals.

Figure 5:
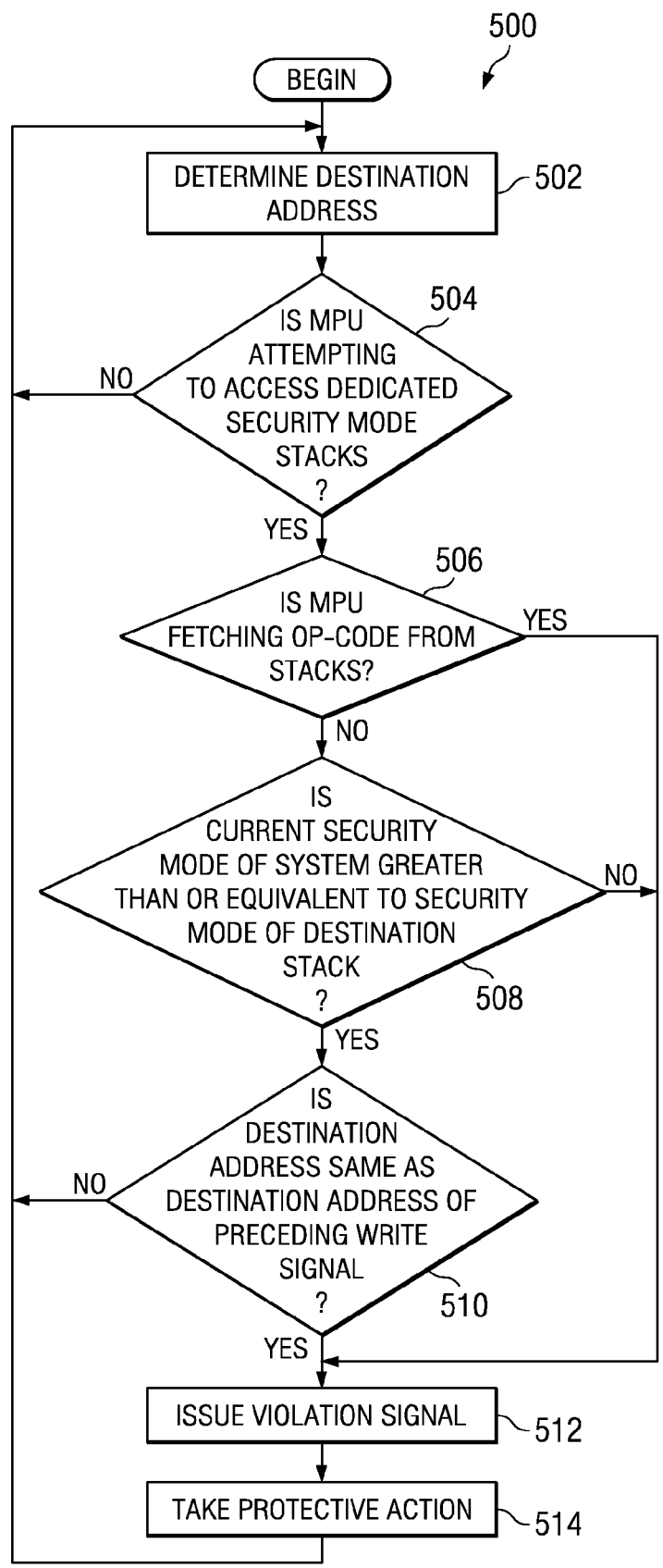
FIG. 5 shows a flow diagram of a method in accordance with embodiments of the invention.

FIG. 5 shows a flow diagram of a method 500 usable in accordance with embodiments of the invention. The method 500 begins by determining a destination address of an access to storage 106 (block 502) and determining whether the MPU 102 is attempting to access dedicated security mode stacks (block 504). As described above, the firewalls in the SSM 104 may determine whether the MPU 102 is attempting to access dedicated security mode stacks by comparing the destination address of the access to the ranges of addresses stored in the registers 414 of the SSM 104. If the MPU is not attempting to access the dedicated security mode stacks, control of the method 500 returns to block 502. However, if the MPU is attempting to access one of the dedicated stacks, the method 500 also comprises determining whether the MPU is fetching an instruction op-code from the stack (block 506). If the MPU is fetching an instruction op-code from the stack, the method 500 comprises issuing a violation signal (block 512) and taking protective action (block 514).

However, if the MPU is not fetching an op-code from a dedicated stack, the method 500 further comprises determining whether the current security mode of the system 100 (i.e., determined using the bus 128) is more secure than or equivalent in security to the security mode of the destination stack of the current access (block 508). If not, the method 500 comprises issuing a violation signal (block 512) and taking protective action (block 514). Otherwise, the method 500 comprises determining whether the destination address is the same as the destination address of a preceding write signal (block 510). If the destination address of the current access is identical to that of a preceding write signal, a buffer overflow attack is likely being carried out on the system 100. Accordingly, the method 500 comprises issuing a violation signal (block 512) and taking protective action (block 514). Otherwise, control of the method 500 resumes at block 502.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
control logic adapted to activate multiple security levels for the system;
a storage coupled to the control logic and comprising a stack, said stack associated with one, but not all, of the multiple security levels; and
security logic coupled to the control logic and adapted to restrict usage of the system if the control logic attempts to fetch an instruction op-code from said stack; wherein the security logic is adapted to restrict usage of the system if the control logic attempts to access said stack while a current security level of the system is less secure than said one of the multiple security levels; and wherein the security logic is adapted to restrict usage of the system if the control logic attempts to access a same location in said stack multiple times in a row.

2. The system of claim 1, wherein the security logic compares a fetch signal from the control logic to a range of addresses associated with the stack to detect when the control logic attempts to access said stack.

3. The system of claim 1, wherein the security logic restricts usage of the system by causing a protective action to be performed, said protective action selected from the group consisting of resetting a program, restarting the system, providing a visual indication, providing an audible indication, providing a tactile indication, interrupting control logic execution, and aborting said fetch attempt.

4. The system of claim 1, wherein the system comprises a mobile communication device.

5. A system, comprising:
control logic adapted to activate multiple security levels for the system;
a storage coupled to the control logic and comprising a stack, said stack associated with one, but not all, of the multiple security levels; and
security logic coupled to the control logic and adapted to restrict usage of the system if the control logic attempts to fetch an instruction op-code from said stack, wherein the security logic is adapted to restrict usage of the system if the control logic attempts to write to a common location in said stack at least twice in a row.

6. A system, comprising:
a storage comprising a range of memory addresses associated with a security mode of the system; and
firewall logic coupled to the storage and adapted to restrict usage of the system if a signal attempting to access an instruction op-code from memory associated with said range of addresses is detected;
wherein the firewall logic restricts usage of the system if the signal attempts to access said memory while a current security mode of the system is less secure than a security mode of the memory; and
wherein the firewall logic restricts usage of the system if said signal attempts to access a location in said memory that was accessed by a preceding signal.

7. The system of claim 6, wherein the range of memory addresses is associated with a stack in a memory coupled to the storage.

8. The system of claim 6, wherein said firewall logic restricts usage of the system by causing a protective action to be performed, said protective action selected from the group consisting of resetting a program, restarting the system, providing a visual indication, providing an audible indication, providing a tactile indication, and aborting said access attempt.

9. A system, comprising:
a storage comprising a range of memory addresses associated with a security mode of the system; and
firewall logic coupled to the storage and adapted to restrict usage of the system if a signal attempting to access an instruction op-code from memory associated with said range of addresses is detected, wherein the firewall logic is adapted to restrict usage of the system if said signal attempts to write to a location in said memory that was written to by a preceding signal.

10. A method of protecting a system, comprising:
monitoring memory access signals, at least a portion of said memory associated with one, but not all, of a plurality of security modes; and
if one of said memory access signals attempts to access an instruction op-code from said portion, restricting usage of the system wherein, if the one of said memory access signals attempts to access said portion while a current security mode of the system is less secure than said one of the plurality of security modes of the memory, restricting usage of the system; and wherein, if the one of said memory access signals attempts to access a location in said portion identical to that accessed by a preceding signal, restricting usage of the system.

11. The method of claim 10, wherein said portion comprises a stack.

12. The method of claim 10, wherein restricting usage of the system comprises performing a protective action selected from the group consisting of resetting a program, restarting the system, providing a visual indication, providing an audible indication, providing a tactile indication, and aborting said access attempt.

13. A method of protecting a system, comprising:
monitoring memory access signals, at least a portion of said memory associated with one, but not all, of a plurality of security modes; and
if one of said memory access signals attempts to access an instruction op-code from said portion, restricting usage of the system, wherein, if the one of said memory access signals attempts to write to a location in said portion identical to that written to by a preceding signal, restricting usage of the system.

\* \* \* \* \*